United States Patent
Kleppe et al.

(10) Patent No.: US 12,094,081 B2
(45) Date of Patent: Sep. 17, 2024

(54) METHOD FOR SUPER-RESOLUTION EVALUATION OF MICROSCOPE IMAGES ILLUMINATED IN A STRUCTURED MANNER AND MICROSCOPE HAVING STRUCTURED ILLUMINATION

(71) Applicant: Carl Zeiss Microscopy GmbH, Jena (DE)

(72) Inventors: Ingo Kleppe, Jena (DE); Yauheni Novikau, Apolda (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 17/470,099

(22) Filed: Sep. 9, 2021

(65) Prior Publication Data
US 2022/0076379 A1     Mar. 10, 2022

(30) Foreign Application Priority Data
Sep. 10, 2020   (DE) ...................... 10 2020 211 380.7

(51) Int. Cl.
*G06T 3/40*     (2006.01)
*G02B 21/36*    (2006.01)
(Continued)

(52) U.S. Cl.
CPC .......... *G06T 3/4053* (2013.01); *G02B 21/365* (2013.01); *G06T 5/20* (2013.01);
(Continued)

(58) Field of Classification Search
CPC ..................... G06T 3/4053; G06T 5/20; G06T 2207/10056; G06T 2207/10152;
(Continued)

(56) References Cited

U.S. PATENT DOCUMENTS 11,189,016 B1 * 11/2021 Chen ....................... G06T 5/003
2008/0088920 A1   4/2008 Wolleschensky
(Continued)

FOREIGN PATENT DOCUMENTS

DE           19908883 A1    9/2000
DE      102018009056 A1    5/2020

OTHER PUBLICATIONS

Heintzmann, R., et al.; "Super-Resolution Structured Illumination Microscopy"; Chemical Reviews 2017; 117:13890-13908.
Gustafsson, M., et al.; "Surpassing the lateral resolution limit by a factor of two using structured illumination microscopy"; Journal of Microscopy 2000; 198(2):82-87.
(Continued)

*Primary Examiner* — James T Boylan
(74) *Attorney, Agent, or Firm* — Duane Morris LLP

(57) ABSTRACT

Method for super-resolution evaluation of microscope images illuminated in a structured manner and microscope having structured illumination. The resolution can be improved laterally by a factor of up to two using conventional linear structured Illumination (SIM). If a non-linear iterative method is used for the purpose of deconvolution, the achievable resolution can be improved beyond the theoretical limit. However, the known methods only achieve a small amount of increase. The novel method is intended to make improved resolution or improved contrast possible. If a PSF/OTF that is manipulated (individually for each order) in the same (or in a corresponding) way as the relevant order spatial frequency spectrum is used during the re-weighting in the spatial frequency domain (for the deconvolution), the actually achievable resolution can be nearly doubled in comparison with the conventional SIM, both in one-stage and in two-stage variants.

18 Claims, 6 Drawing Sheets

(51) Int. Cl.
  *G06T 3/4053* (2024.01)
  *G06T 5/20* (2006.01)
  *H04N 23/56* (2023.01)
  *H04N 23/951* (2023.01)

(52) U.S. Cl.
  CPC .......... *H04N 23/56* (2023.01); *H04N 23/951* (2023.01); *G06T 2207/10056* (2013.01); *G06T 2207/10152* (2013.01); *G06T 2207/20048* (2013.01)

(58) Field of Classification Search
  CPC .......... G06T 2207/20048; H04N 23/56; H04N 23/951; G02B 21/365
  See application file for complete search history.

(56) References Cited

U.S. PATENT DOCUMENTS

| | | | |
|---|---|---|---|
| 2019/0258041 A1* | 8/2019 | Anhut | G02B 21/0064 |
| 2019/0328208 A1* | 10/2019 | Kashima | A61B 1/00043 |
| 2020/0064609 A1 | 2/2020 | Krampert et al. | |
| 2021/0118110 A1* | 4/2021 | Langlois | G02B 21/0032 |

OTHER PUBLICATIONS

Gustafsson, et al.; "Three-Dimensional Resolution Doubling in Wide-Field Fluorescence Microscopy by Structured Illumination"; Biophysical Journal 2008; 94:4957-4970.

Verveer, et al.; "A comparison of image restoration approaches applied to three-dimensional confocal and wide-field fluorescence microscopy"; Journal of Microscopy 1999; 193(1):50-61.

Biggs, et al.; "3D Deconvolution Microscopy"; Current Protocols in Cytometry 2010; 52:12.19.1-12.19.20.

Perez, et al.; "Optimal 2D-SIM reconstruction by two filtering steps with Richardson-Lucy deconvolution"; Scientific Reports 2016; 6:371149.

Zhang, et al.; "Super-resolution algorithm based on Richardson-Lucy deconvolution for three-dimensional structured illumination microscopy"; Journal of the Optical Society of America A 2019; 36(2):173-178.

Richards, et al.; "Electromagnetic diffraction in optical systems, II. structure of the image field in an aplanatic system"; Proceedings of the Royal Society London Ser. A 1959; 253:358-379.

Müller, C., et al.; "Image scanning microscopy"; Physical Review Letters 2010; 104:19801-1-198101-4.

Bozinovic, et al.; "Fluorescence endomicroscopy with structured illumination"; Optics Express 2008; 16(11):8016-8025.

www.gattaquant.com.

* cited by examiner

Fig. 5 - Prior art

METHOD FOR SUPER-RESOLUTION EVALUATION OF MICROSCOPE IMAGES ILLUMINATED IN A STRUCTURED MANNER AND MICROSCOPE HAVING STRUCTURED ILLUMINATION

RELATED APPLICATIONS

The present application claims priority benefit of German Application No. DE 102020211380.7 filed on Sep. 10, 2020, the contents of which is incorporated by reference in its entirety.

FIELD OF THE INVENTION

The invention relates to a method for super-resolution evaluation of microscope images of a sample, comprising: providing a plurality of digital raw images of the sample that are recorded sequentially by means of a microscope by illuminating the sample in different phases with periodically structured illumination light, providing an optical transfer function that represents imaging of the microscope, ascertaining a plurality of order spatial frequency spectra on the basis of the raw images, reconstructing an intermediate result image spatial frequency spectrum, weighting the optical transfer function for each ascertained order spatial frequency spectrum and re-weighting the intermediate result image spatial frequency spectrum on the basis of the weighted optical transfer function for each ascertained order spatial frequency spectrum. The invention additionally relates to a correspondingly designed microscope having structured illumination.

BACKGROUND OF THE INVENTION

The resolution of known microscopes is dependent, on account of the diffraction of the light received by the sample in the microscope objective, on the aperture thereof and on the wavelength of the light. Since the utilizable wavelength range of the visible light is finite, the resolution of a microscope is limited in principle (Abbe 1873). With respect to the spatial frequencies of the sample that are to be imaged, this means that the support of the optical transfer function (OTF) of the microscope in the spatial frequency domain is limited to a finite region around the coordinate origin. Consequently, the microscope can image only spatial frequencies that lie in the interval in which the support does not vanish. The OTF is the point spread function (PSF) of the microscope that has been transformed into a spatial frequency domain. The PSF indicates how a point light source is imaged through the microscope.

With a conventional structured illumination of the sample in a plurality of different angles with subsequent computation of the raw images that were recorded in a phase-wise manner (known as "structured illumination microscopy SIM"), the resolution can be improved laterally by a factor of up to two if the excitation intensity of the illumination and the emission intensity of the sample are related linearly. SIM is disclosed for example in DE 19908883 A1 and in the essay "Surpassing the lateral resolution limit by a factor of two using structured illumination microscopy" by M. Gustafsson (Journal of Microscopy, Volume 198, 2000, page 82). It is based on the generation of a spatial, periodic light structure on the sample to be examined, for example by sinusoidal interference of the illumination light downstream of an optical grating. Due to the convolution of the sample response with the PSF of the microscope in the spatial domain, a region of spatial frequencies of the sample structure that lie outside the support of the OTF in the spatial frequency domain is shifted into the central support interval where they superpose the original spatial frequency intensities there so that Moiré effects are seen in the raw images. The Fourier transform of each raw image here contains a plurality of frequency-shifted "copies" of the spatial frequency spectrum of the sample in a respective frequency band. Each of these copies is referred to as a separate "order." Their number depends on the number of the mutually interfering beams from which the periodic light structure is generated.

According to the SIM method it is possible to reconstruct, from a set of such raw images that contain the superpositions of the shifted and the original spatial frequencies, a result image that contains both the original spatial frequencies of the support interval and the original higher spatial frequencies that have been temporarily shifted into the support interval by the structured illumination. Consequently, the result image has a higher lateral resolution than a conventional single recording with uniform illumination. This resolution is referred to as super resolution when it is finer than the diffraction-limited resolution of the microscope.

The SIM can also attain axial super resolution (known as 3D-SIM). To this end, the illumination in the sample must also be axially periodically structured, and for each of N sample planes, a separate set of raw images from the relevant plane is recorded. From a system of equations that describes the interactions in all N sample planes, it is possible to calculate a z-stack from N axially, in particular also laterally, super-resolved result images. The 30-SIM is described in Gustafsson et al.: "Three-Dimensional Resolution Doubling in Wide-Field Fluorescence Microscopy by Structured Illumination," Biophys. J., vol. 94, 2008, page 4957).

Conventionally, the following five steps are performed for image evaluation of SIM raw images:

1. Ascertaining order spatial frequency spectra (that is to say in particular extracting and separating the frequency bands carrying high-resolution information). For this purpose, Moiré patterns contained in the raw images are decoded by solving a linear equation system in the spatial frequency domain and thus a respective spatial frequency spectrum for each order is ascertained. In the 3D case, the equation system describes a plurality of sample planes and the order spatial frequency spectra are three-dimensional.
2. Determining the phase angle and actual repetition frequencies (for example grid frequencies) of the illumination pattern from the raw images. On the basis of these parameters, artifacts can preferably be minimized in a later step. This step is not absolutely necessary but, in practice, makes it possible to compensate experimental inaccuracies.
3. Frequency filtering the order spatial frequency spectra for suppressing repetition frequencies and in particular low-frequency background (which comes to lie at higher frequencies owing to the subsequent shift and leads there to artifacts in the final image).
4. Shifting the frequency bands extracted in the first step to the corresponding positions in the spatial frequency domain (in order to be able to put together the high-resolution image in the spatial frequency domain in the subsequent step).
5. Putting together the shifted frequency bands to compose the super-resolved result image spatial frequency spectrum in a combined step comprising:

a. weighted summation of the shifted frequency regions with i) weights based on the illumination components due to different illumination intensities of the individual frequencies and ii) weights derived from the optical transfer function,
b. use of a generalized Wiener filter to smooth the composition, in particular at the inner edges of the frequency bands,
c. utilization of an apodization function to suppress ringing artifacts produced by the Wiener filter.

Finally, the super-resolved result image is transformed from the spatial frequency domain into the spatial domain by an inverse Fourier transform.

As an alternative to this conventional procedure, two-stage evaluation methods are known in which, in the fifth step, the above sub-steps are replaced by initially ascertaining an intermediate result image spatial frequency spectrum by weighting only on the basis of the illumination components (rather than on the basis of the PSF or OTF) and without Wiener filter. In an additional (sixth) step, the super-resolved result image spatial frequency spectrum is ascertained by a deconvolution of the intermediate result image spatial frequency spectrum on the basis of a total PSF (for SIM) combined from all orders or of a correspondingly combined total OTF. If a non-linear method is used for the deconvolution, the achievable resolution can be improved beyond the theoretical limit of the one-stage SIM (and of the two-state SIM with linear iterative approximation) because, due to constraints that are known a priori, such as non-negativity, frequencies outside the support of the PSF can also be reconstructed (Verveer et al.: "A comparison of image restoration approaches applied to three-dimensional confocal and widefield fluorescence microscopy," J. Micr. vol. 193, 1999, page 50). This also in particular applies to what is known as the Richardson-Lucy method (Biggs: "3D Deconvolution Microscopy," Current Protocols in Cytometry 12.19,1-12.19.20, April 2010).

Such an SIM method in the two-dimensional case is described by Perez et al. in "Optimal 2D-SIM reconstruction by two filtering steps with Richardson-Lucy deconvolution," Scientific Reports 6:371149. Here, the raw images are additionally deconvolved on the basis of the microscope PSF or microscope OTF before further processing in order to reduce artifacts. The three-dimensional case is described by Zhang et al. in "Super-resolution algorithm based on Richardson-Lucy deconvolution for three-dimensional structured illumination microscopy," Journal of the Optical Society of America A, vol. 36, no. 2. The deconvolution in both cases is performed, according to the titles, by means of an iterative approximation method according to Richardson-Lucy. However, the resolution attained exceeds the theoretical maximum of the conventional one-stage evaluation with Wiener filter in the case of Zhang et al. merely by 13% and in the case of Perez at al. merely by 20%.

SUMMARY OF THE INVENTION

The invention is based on the object of improving a method and a microscope of the type mentioned in the introductory part such that improved resolution or improved contrast can be achieved.

The object is achieved by a method and microscope having the features specified in the appended independent claims.

Advantageous refinements of the invention are specified in the dependent claims.

The invention is based on the finding that the two-stage reconstruction has indeed significant advantages in comparison with the one-stage reconstruction, but that the final re-weighting in the spatial frequency domain for the deconvolution in the procedure known until now does not achieve the maximum possible increase in resolution because, until now, a PSF or OTF that is not adapted to the evaluation has been used. The specific reason is that the contributions from the different orders in the known methods are manipulated in the course of the evaluation, but the PSF or OTF remains unchanged (except for the necessary shift in the spatial frequency domain). If, however, a PSF/OTF that is manipulated (individually for each order) in the same (or in a corresponding) way as the relevant order spatial frequency spectrum is used according to the invention during the re-weighting (for the deconvolution), the actually achievable resolution can be nearly doubled in comparison with the conventional SIM, both in one-stage and in two-stage variants. The invention is here not limited to iterative deconvolution methods but can also be implemented with non-iterative methods. However, it not a significant improvement in resolution that is then achieved but an improvement in contrast, in comparison with the conventional SIM.

The invention therefore also provides, corresponding to the manipulation of at least one of the order spatial frequency spectra before or during the reconstruction, manipulation of the optical transfer function for the relevant order spatial frequency spectrum before or during the (that is to say in the same calculation step as the) re-weighting, with the result that the re-weighting takes place on the basis of the manipulated OTF. The manipulation in this case is not the (known and necessary) shift in the spatial frequency domain to the original frequency bands, but, for example, relative re-weighting between different spatial frequency components of the OTF. In particular, the relative re-weighting during the manipulation can take place such that the sum of all the intensities of discrete frequency regions that are contained in the OTF changes.

The use of the optical transfer function manipulated like the order spatial frequency spectra during the deconvolution of the intermediate result image spatial frequency spectrum results in a substantially higher resolution in the deconvolved result image. The corresponding manipulation of the OTF can take place, for example, with an identical algorithm or an identical mathematical operation as in the order spatial frequency spectra.

In the same way as the provided OTF (PSF) represents the characteristic of the raw images brought about by the microscope optical units, does the manipulated OTF (PSF) in addition also represent the characteristic brought about by the digital processing of the raw images. This makes a significant improvement in iterative methods possible by virtue of the fact that the number of the iterations can be sufficiently large. In this way, a resolution of up to approximately 60 nm can be achieved in the result image.

In order to realize this, for example a number of copies of the OTF that corresponds to the number of order spatial frequency spectra to be ascertained is provided. Each OTF copy is exclusively assigned to a respective order spatial frequency spectrum, with the result that exactly one OTF copy belongs to each order spatial frequency spectrum. In each copy, the OTF is shifted to the location in the spatial frequency domain that corresponds to the associated order. If a manipulation of one of the order spatial frequency spectra is performed, the associated OTF is manipulated in a corresponding manner. If a plurality of manipulations are performed on an order spatial frequency spectrum, all of them, or merely a real subset thereof, can also be performed accordingly on the OTF. It is irrelevant here whether the manipulation is done in the spatial domain or in the spatial frequency domain.

In the simplest case, the OTF provided (of which for example the abovementioned copies shifted in the frequency domain are made) can be based on a Gaussian PSF. Significantly better results can be attained by a typical microscope OTF (widefield) as is known in the prior art and is used for example by Perez et al, and Zhang et al, (3D-PSF according to Richards and Wolf: "Electromagnetic diffraction in optical systems, II. Structure of the image field in an aplanatic system," Proc. R. Soc. London Ser. A, vol. 253, page 358). Alternatively, the OTF can also be provided on the basis of other PSF models.

Alternatively, the OTF provided can be ascertained on the basis of a measured OTF or PSF. In particular, such a measurement can be effected with at least one (quasi-)point-shaped fluorescence light source (for example one or more beads) as the calibration sample in the relevant microscope, with which the raw images of the actual sample have been recorded. For this purpose, a simple widefield recording (with diffraction limitation) can be made, which directly contains the PSF. Alternatively, structured illumination can be carried out in a plurality of illumination phases, wherein in each case one individual image is recorded in each phase. Orders are separated in the SIM from the individual images of the calibration sample by way of demodulation of the Moiré patterns and are shifted, for example on the basis of one or more actual repetition frequencies, which are preferably ascertained from the raw images of the actual sample, to their original locations in the spatial frequency domain and combined on the basis of their respective illumination intensities. The result is provided as OTF.

Alternatively, the OTF provided can be ascertained by a simulation of an imaging operation of one or more point light sources through the relevant microscope. In this case, structured illumination can be simulated in a plurality of illumination phases with illumination parameters that are determined on the basis of the raw images. For example, one or more actual repetition frequencies of the light structure and its respective actual position and/or orientation at which the raw images have been recorded can be ascertained from the raw images. The structured illumination of the individual images in the simulated SIM is then performed on the basis of this one or more actual repetition frequencies and in the actual position and/or orientation belonging to the relevant raw image. Orders are separated from these individual images by way of demodulation of the Moiré patterns and are shifted, for example on the basis of one or more actual repetition frequencies, to their original locations in the spatial frequency domain and combined on the basis of their respective illumination intensities. The result is provided as OTF.

Within the meaning of the invention; the illumination light is periodically structured one-dimensionally (line pattern) or two-dimensionally (cross grid pattern) transversely to the optical axis of the detection direction with which the raw images have been recorded and has in particular at least one corresponding repetition frequency. When radiated in through the detection objective, the illumination light is thus typically periodically structured at least transversely to its propagation direction. It can be structured one-dimensionally, two-dimensionally or three-dimensionally, typically in each case sinusoidally, wherein the repetition frequencies can, but do not have to, differ in the different spatial directions. When radiated in by means of a second objective, for example in the form of a light sheet, the illumination light can be structured longitudinally with respect to its propagation direction (optical axis of the illumination) (and in that case for example only one-dimensionally, that is to say not transversely to its propagation direction). The order spatial frequency spectra are ascertained in particular such that in each case two of them contain spatial frequency contributions from different spatial frequency bands ("orders") of the illumination light such that it is possible to reconstruct from them an intermediate result image with a resolution that is increased in comparison with the raw images. For this purpose, the raw images can be transformed (optionally after pre-processing) from the spatial domain into a spatial frequency domain, in particular by means of an integral transform or by means of a discrete transform, for example by means of a Laplace transform, Fourier transform, wavelet transform or Z-transform or by means of another transform suitable for spectral analysis. The orders are defined by the structure, in particular an interference structure of the raw images. The reconstruction of the intermediate result image spectrum, whose (back-)transform into the spatial domain (that is to say the intermediate result image) has a higher resolution than the raw images, takes place in particular on the basis of the order spatial frequency spectra. The optical transfer function can preferably represent imaging of the microscope during the recording of the raw images. The microscope with which the raw images are recorded can in this case be in particular a virtual microscope in which the raw images are recorded from a simulation. The re-weighting can in particular be performed such that the re-weighting corresponds to a deconvolution in the spatial domain on the basis of the point spread function. After the re-weighting, the intermediate result image spatial frequency spectrum is preferably transformed back from the spatial frequency domain into the spatial domain (typically by means of an inverse transform to the abovementioned integral transform or discrete transform) in order to ascertain the super-resolved result image (and thereby to deconvolve the intermediate result image of the PSF). However, such a back-transform is not necessary in all cases. If, for example, only the spatial frequency spectrum of the result image is needed at any rate for further processing, the back-transform can be dispensed with.

Advantageously, each of the order spatial frequency spectra is manipulated in at least one image processing step such that an intermediate result image is able to be reconstructed, on the basis of the manipulated order spatial frequency spectra, with a resolution that is increased in comparison with the raw images. The intermediate result image, which has a higher resolution than the raw images, is preferably reconstructed on the basis of the manipulated order spatial frequency spectra.

In this case, steps 1 to 5 from the conventional SIM method can here be performed according to the invention. Alternatively, steps 1 to 6 from the known two-stage method can be performed. According to the invention, wherever an OTF (or PSF) is used in these methods, the correspondingly manipulated OTF (or PSF) is used.

Embodiments in which the manipulation comprises or is a spatial-frequency-dependent operation, in particular a spatial-frequency-dependent weighting, in particular spatial-frequency-dependent filtering (suppression), more particularly spatial-frequency-dependent notch filtering (with suppression in the notch), in particular around a respective coordinate origin (that is to say around the location of the zero frequency), are particularly advantageous. Such an operation, in particular in the form of a weighting or filtering, has a significant influence on the quality of the PSF/OTF. In this way, a significant improvement in the resolution beyond the resolution of the known SIM can be achieved. By filtering the zero order of the illumination structure, in particular out-of-focus light in the order spatial frequency spectra can be suppressed particularly effectively. The corresponding filtering of the OTF makes a particularly high resolution as part of the deconvolution possible. Without it, the out-of-focus background could outweigh the structures contained in the image plane. Alternatively or additionally, a low-pass filter can be used to suppress high-frequency noise or camera-specific frequencies (for example strips of sCMOS detectors).

It is advantageous here if the illumination light in the sample has at least one repetition frequency and the spatial-frequency-dependent filtering comprises notch filtering that is also dependent on the at least one repetition frequency, in particular notch filtering for the suppression of the illumination structuring frequencies (in other words of at least one repetition frequency). This filtering that is dependent on the repetition frequency can alternatively or additionally to the filtering of the zero order (which is dependent on the repetition frequency) as described before filter a higher, non-zero order (in a suppressing manner), for example likewise using a notch filter, in particular around the center of the order. Artifacts can thereby be reduced.

Particularly preferred are embodiments in which the illumination light is also periodically structured along an optical axis of the image recording and different raw images originate from different planes of the sample, wherein the ascertainment of the order spatial frequency spectra on the basis of raw images from different planes of the sample is effected such that three-dimensional order spatial frequency spectra are ascertained, and wherein the optical transfer function is provided three-dimensionally and the deconvolution is effected three-dimensionally. Such embodiments make possible a significant increase in the resolution even in 3D-SIM.

In the reconstruction of the intermediate result spatial frequency spectra, preferably no weighting of the order spatial frequency spectra on the basis of the optical transfer function takes place, but weighting of the order spatial frequency spectra on the basis of the (respective) optical transfer function is also possible. Advantageously, weighting according to the respective illumination intensity of the relevant order can be performed alternatively or additionally. In this way, it is possible to take into account the weighting of the contributions by the effect of the OTF (manipulated like the respective order spatial frequency spectrum), which makes better image resolution possible.

Manipulation within the meaning of the invention changes the manipulated mathematical entity, typically in order to compensate, correct or suppress errors or artifacts of any type, for example optical aberrations or out-of-focus light. The manipulation in this case differs from an integral transform and from a discrete transform, in particular in a manner such that the optical transfer function for the relevant order spatial frequency spectrum is changed, in particular changed significantly. An integral transform or discrete transform is not manipulation within the meaning of the invention because it merely transforms the treated mathematical entity into another representation without changing it.

Of particular advantage are embodiments in which the deconvolution takes place iteratively, in particular non-linearly, more particularly by means of a Richardson-Lucy method or a maximum-likelihood estimation. Using these methods, a particularly high improvement in the resolution of the result image can be achieved because they are particularly sensitive with respect to the quality of the PSFs used in the deconvolution. If a PSF that is not treated correspondingly like the orders before the deconvolution is used in the conventional manner, the iterative algorithm does not converge. A non-iterative deconvolution is also possible. In this way, a better contrast than with conventional methods can be achieved.

The deconvolution preferably takes place in significantly more than five iterations, in particular in more than 40 iterations. As a result, a particularly high resolution may be achieved.

It may be advantageous if a manipulation of the raw images is performed before the order spatial frequency spectra are ascertained, in particular a spatial-frequency-dependent manipulation, more particularly a spatial-frequency-dependent frequency re-weighting, more particularly filtering and/or a deconvolution, in particular with the manipulation-free optical transfer function provided, and wherein the ascertainment of the order spatial frequency spectra takes place on the basis of the manipulated raw images. For example, the pre-processing described by Perez et al. can be performed.

A particularly high level of accuracy of the evaluation can be achieved by ascertaining at least one actual parameter of the structured illumination, in particular a repetition frequency and/or an orientation and/or a position, on the basis of at least one of the raw images or on the basis of previously manipulated raw images. This makes possible for example an ascertainment of the total OTF of the microscope with a high level of accuracy.

Preferably, the manipulation of the order spatial frequency spectra and/or of the OTF comprises or is a respective shift and/or a respective weighting and/or a weighted summation, on the basis of the ascertained actual parameter.

The OTF can be provided on the basis of the at least one ascertained actual parameter, in particular by ascertaining simulated individual images under simulated structured illumination with the at least one ascertained actual parameter and an SIM evaluation of the simulated individual images, from which the OTF is ascertained. It is thus possible to obtain a particularly accurate PSF/OTF, which in turn makes possible the reconstruction of the result image with a particularly high resolution (or high contrast in the case of non-iterative or linearly iterative deconvolution).

Expediently, it is possible that for each order spatial frequency spectrum a copy of the OTF that is shifted in correspondence with the order spatial frequency spectrum is provided and that in all subsequent method steps a respective one of these copies is used as the OTF.

Preferably, as part of the SIM evaluation, different order spatial frequency spectra that are contained in the raw images or in raw images that were manipulated previously are demodulated and separated during the ascertainment of the order spatial frequency spectra and shifted in the spatial frequency domain before or during the reconstruction of the intermediate result image, wherein the separated and shifted order spatial frequency spectra are combined during the reconstruction of the intermediate result image.

In one possible embodiment, the weighted optical transfer functions are combined to form a total transfer function (total OTF) and the deconvolution takes place on the basis of the total transfer function, wherein in particular the manipulation of the optical transfer function for the relevant order spatial frequency spectrum takes place before or during the combination. This procedure makes possible simpler calculation steps.

The total OTF is preferably ascertained using the equation $$OTF_{SR}(k_x,k_y,k_z)=\Phi(k_x,k_y,k_z)\Sigma_j A_j\omega_j(k_x,k_y,k_z)OTF_j(k_x-j\hat{k}_x,k_y-j\hat{k}_y,k_z),$$

wherein the sum (Index j) runs over all orders (order spatial frequency spectra).

The raw images are expediently recorded by sequentially recording, by means of a microscope, in each case with illumination of the sample in different phases with structured illumination light (29), sample light emitted and/or scattered by the sample per phase by means of a detector into a respective raw image in a manner such that it is possible to reconstruct from the raw images an intermediate result image having a resolution that is increased compared to the raw images. As in all steps, the result of the reconstruction in this case does not absolutely need to be an image in the spatial domain ("intermediate result image"), but, alternatively or additionally, a spatial frequency spectrum can be reconstructed ("intermediate result image spatial frequency spectrum").

Preferably, a two-dimensionally spatially resolving detector is used to record the raw images, in particular without a stop that optically sections the sample in front of the detector. In this way, the sample can be stressed less because exposure times that are shorter in comparison with a scanning image recording are possible. Accordingly it is possible to generate the illumination light structure by interference and/or by modulation of a scanning (point-shaped or line-shaped) illumination light spot.

The invention also comprises a microscope having a control unit, configured for carrying out an abovementioned method, and having a light source, a two-dimensionally spatially resolving detector for recording raw images of the sample, and means for generating periodically structured illumination light in the sample in different phases, wherein in particular no stop that optically sections the sample is arranged in front of the detector. The control unit can have an input interface via which the raw images and the OTF can be provided. The control unit can have an output interface via which the result image can be output.

The invention also comprises a computer program that is configured for carrying out an above-described method.

Within the meaning of the invention, in all steps, the image and spatial frequency spectrum are merely different representations of the same mathematical entity that can always be exchanged for one another (with transformation into the spatial frequency domain or back-transformation into the spatial domain) without departing from the scope of the invention. The same applies to the PSP and OTF.

The raw images of a fluorescent sample are typically recorded with excitation of the fluorescence thereof. The invention can also comprise providing a sample labeled with at least one fluorescent dye.

BRIEF DESCRIPTION OF THE DRAWINGS

The invention is explained in more detail below on the basis of exemplary embodiments.

In the drawings.

DETAILED DESCRIPTION OF THE DRAWINGS

Figure 1:
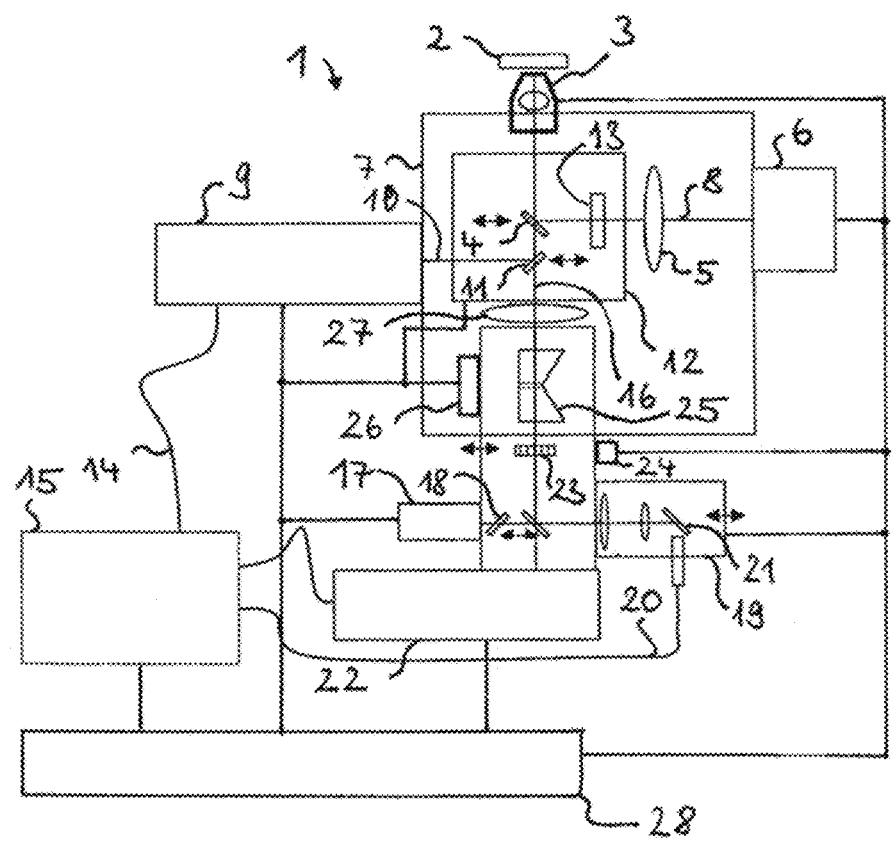
FIG. 1 shows a multimodal microscope.

In the annexed drawings, corresponding parts are designated by the same reference numerals.

FIG. 1 shows a microscope 1 having different operating modes. Said microscope is capable of performing both conventional microscopy methods, that is to say microscopy methods the resolution of which is diffraction-limited, and super-resolution microscopy methods, that is to say microscopy methods the resolution of which goes beyond the diffraction limit. This is an inverted microscope. Alternatively, it may be embodied in the form of an upright microscope.

The microscope 1 captures a sample 2. For this purpose, it has an objective 3 through which the radiation for all microscopy methods described below passes.

The objective 3 images, via a beam splitter 4, the sample together with a tube lens 5 onto a COD detector 6, which in the example is a two-dimensionally spatially resolving area detector. To this extent, the microscope 1 has a conventional light microscope module 7, and the beam path from the sample 2 through the objective 3 and the tube lens 5 to the COD detector 6 corresponds to a conventional widefield detection beam path 8. As indicated by the double-headed arrow in FIG. 1, the beam splitter 4 is interchangeable so as to be able to switch between beam splitters having different dichroic properties or achromatic beam splitters as per US 2008/0088920.

Additionally connected in the beam path to the objective 3 is a laser scanning module 9, the LSM illumination and detection beam path of which is coupled into the beam path to the objective 3 via a switching mirror 11, which likewise possesses beam splitter functions. The beam path from the switching mirror 11 to the objective 3 through the beam splitter 4 is thus a beam path in which the illumination beam path and the detection beam path are combined. This is true both with respect to the laser scanning module 9 and also with respect to the widefield detection beam path 8, because, as will be explained below, illumination radiation which, together with the widefield detection beam path 8, i.e. the CCD detector 6, realizes microscopy methods, is also coupled in at the switching mirror 11.

The switching mirror 11 and the beam splitter 4 are combined to form a beam splitter module 12, as a result of which there is the possibility of interchanging the switching mirror 11 and the beam splitter 4 depending on the application. This is also illustrated by double-headed arrows. Furthermore provided in the beam splitter module 12 is an emission filter 13 that is located in the widefield detection beam path 8 and appropriately filters the spectral components that can propagate through the widefield detection beam path 8. The emission filter 13 in the beam splitter module 12 is of course also interchangeable.

The laser scanning module 9 receives laser radiation required for the operation from a laser module 15 via an optical fiber 14.

In the construction illustrated in FIG. 1, a collective illumination beam path 16, through which illumination radiation for various microscopy methods passes, is coupled in at the beam splitter module 12, more specifically at the switching mirror 14. Different illumination beam paths of individual illumination modules are coupled into this collective illumination beam path 16. For example, a widefield illumination module 17 couples widefield illumination radiation into the collective illumination beam path 16 via a switching mirror 18, such that the sample 2 is illuminated in widefield via a tube lens 27 and the objective 3. The widefield illumination module 17 can have an HBO lamp, for example. Provided as a further illumination module is a TIRF illumination module 19, which realizes TIRF illumination with the appropriate positioning of the switching mirror 18. The TIRF illumination module 19 to this end receives radiation from the laser module 15 via an optical fiber 20. The TIRF illumination module 19 has a mirror 21 that is longitudinally displaceable. On account of the longitudinal displacement, the illumination beam emitted by the TIRF illumination module 19 is displaced perpendicularly to the main propagation direction of the emitted illumination beam, as a result of which the TIRF illumination is incident at the objective 3 at an adjustable angle with respect to the optical axis of the objective. In this way, the required angle of total internal reflection at the coverslip can be readily ensured. Other means are of course also suitable for effecting this angle adjustment.

Furthermore coupled to the collective illumination beam path is the illumination beam path of a manipulator module 22 which likewise receives radiation from the laser module 15 via an optical fiber (not designated further here) and guides a point-shaped or line-shaped beam distribution over the sample 2 in a scanning fashion. The manipulator module 22 thus substantially corresponds to the illumination module of a laser scanning microscope, and, as a consequence, the manipulator module 22 can also be operated in a manner combined with the detector of the laser scanning module 9 or the widefield detection of the COD detector 6.

A grating 23, having a grating constant below the cut-off frequency that can be transferred with the microscope 1 into the sample 2, is furthermore provided in the collective illumination beam path 16. The grating 23 can be arranged for example in a plane (intermediate image of the sample) of the illumination beam path 16 that is imaged into the sample. The grating 23 is displaceable transversely to the optical axis of the collective illumination beam path 16 in preferably two dimensions transversely to the optical axis. To this end, a corresponding displacement drive 24 is provided.

An image field rotator 25, which is rotated by a rotator drive 26, is furthermore arranged in the collective illumination beam path 16 downstream of the grating in the illumination direction. The image field rotator can be for example an Abbe-Koenig prism. If the grating 23 is two-dimensionally structured, the image field rotator 25 can be dispensed with because the resulting illumination structure requires no rotation. Instead, it can be displaced in two dimensions, for example.

The microscope 1 comprises a control unit 28, for example a computer in Von-Neumann architecture, which has in particular a processor as a calculation and control unit, a random access memory as the working memory, and a magnetic hard disk as a mass storage means.

The modules and the drives and also the detectors of the microscope 1 are all connected to the control unit 28 via lines (not designated further here). The connection can be realized for example via a data and control bus. The control unit 28 controls the microscope 1 in different operating modes. The control device 28 thus permits the performance of conventional microscopy, that is to say widefield microscopy (WF), in particular with structured illumination (SIM), laser scanning microscopy (LSM), and also fluorescence microscopy with total internal reflection (TIRE), on the microscope 1.

The microscope in FIG. 1 has substantially two modules that are suitable for laser scanner illumination, specifically the laser scanning module 9 and the manipulator module 22. Other combinations are of course also possible. Said modules are coupled via tube lenses with the objective 3 onto the sample 2. The manipulator module 22 includes merely the excitation part of a laser scanning module, without detection. As a result, the sample can be illuminated in point-shaped fashion, and the illumination spot can be scanned over the sample 2.

Preferably, a switching unit, for example a switching lens or cylindrical lens, with which switching between point-shaped and line-shaped illumination is effected, is also located in the manipulator module 22. Said line-shaped illumination is advantageous in particular when the grating 23 is pivoted in and is located perpendicularly to the line of the line-shaped illumination. Alternatively, the line-shaped illumination could be used for the dynamic (sequential) generation of structured illumination in the sample 2.

A variably adjustable stripe modulator or a DMD or an SLM can also be used as an alternative to the grating 23 to generate structured illumination in the sample 2. In that case, the displacement drive 24 and the ability to pivot the grating 23 in and out are of course no longer necessary.

The image field rotator 25 permits the structured illumination that is generated by way of the grating 23 (or by the elements replacing the latter) to be rotated about the optical axis of the collective illumination beam path 16, such that the structured illumination lies at different angles in the sample 2.

To switch between individual operating types, the switching mirrors 18 and 11 and the beam splitter 4 are adjusted appropriately. In the realization, folding or pivot mirrors can be used to this end, such that switching between the operating types can be effected sequentially. Alternatively, dichroic mirrors that permit simultaneous operation of the various modules are also possible.

The beam splitter 4 is preferably embodied in the form of a dichroic beam splitter, wherein the spectral properties are adjustable such that spectral components of fluorescence emission from labeling molecules that are to be detected with the aid of the CCD detector 6 pass into the widefield detection beam path 8, and the remaining spectral components are transmitted if possible. To increase the flexibility with respect to the utilizability of labeling molecules with different emission characteristics, a plurality of different beam splitters 4 and emission filters 13 are arranged in the beam splitter module 12 in a manner such that they are interchangeable, for example on a filter wheel.

The above-described microscope can serve to generate a super-resolved result image. To this end, the control device 28 has an appropriate configuration, for example realized by way of suitable programming.

Figure 2:
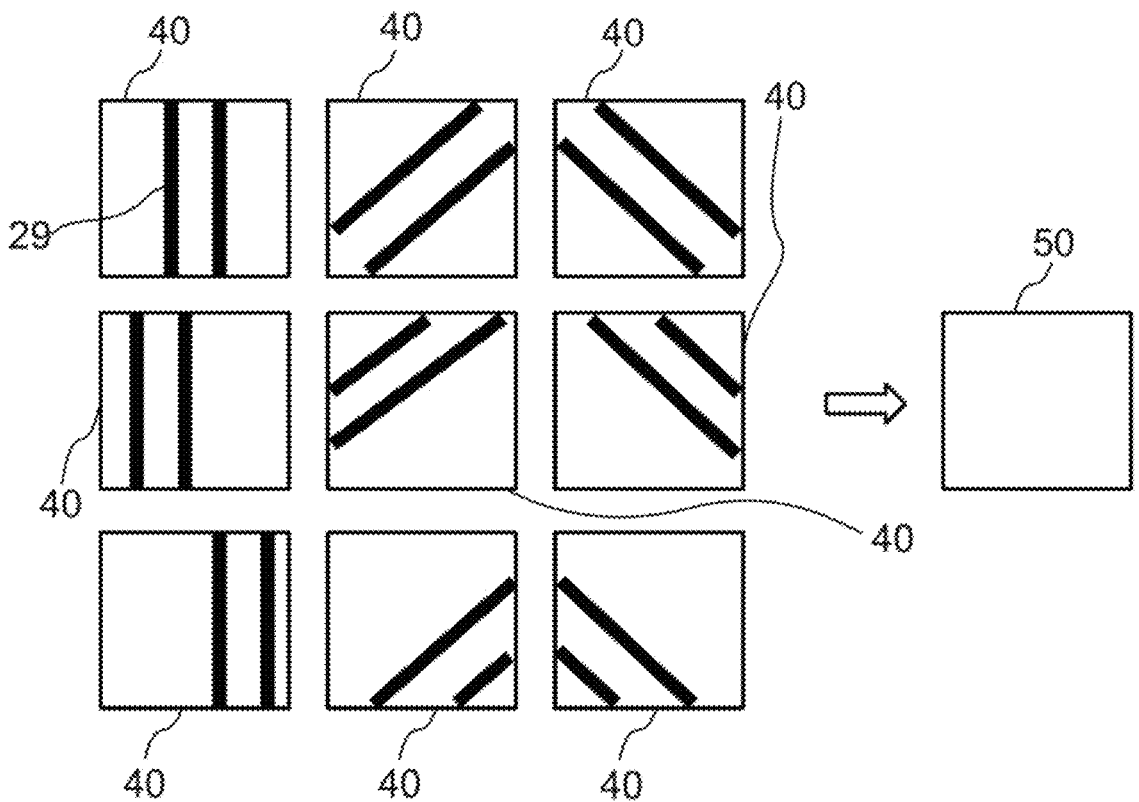
FIG. 2 schematically illustrates the known principle of structured illumination in a plurality of phases, FIG. 3 schematically illustrates the generation of an illumination pattern with three interfering orders in the pupil, FIG. 4 schematically illustrates the generation of an illumination pattern with three interfering orders in the pupil, FIG. 5 schematically illustrates the known one-stage SIM evaluation, FIG. 6 schematically illustrates the two-stage 3D-SIM evaluation that has been improved according to the invention in comparison with the two-stage 2D-SIM evaluation that has been improved according to the invention.

FIG. 2 schematically illustrates the concept for producing a super-resolved image in an individual sample plane according to the SIM method. The sample examined under the microscope 1 in FIG. 1 is repeatedly imaged in widefield, wherein different illumination states are set.

FIG. 2 shows a set of raw images 40 from a single sample plane that all represent the same sample region but differ in terms of a light structure 29 that is transferred during the recording of the raw images 40 into the sample 2 by way of structured illumination by means of the illumination beam path 16. As can be seen, the lateral, periodic light structure 29 generated for example by means of the grating 23 is oriented and positioned differently in the different raw images 40, but has an identical repetition frequency in all the raw images 40 (depending on the grating frequency of the grating 23). In total, the example includes nine raw images 40, which are made up of three different orientations of the structure 29 and three different displacement positions of the structure 29. The various orientations and displacement positions are grouped together under the term phases. Different and larger numbers of different phases are of course also possible, as is known from the publications cited above relating to the principle of SIM.

However, the structure 29 shown is to be understood to be purely an example. In particular, there is no need for it to be a line structure. It is also possible for the schematically drawn lines to be structured further along the lines. Rather than using the line-type structuring used in the initially cited SIM publications, it is equally possible to use scanned confocal point or line illumination with confocal detection, as is known from the publication "Image scanning microscopy" by C. Müller and J. Enderlein, Physical Review Letters, 104, 198101 (2010). This principle is referred to as ISM. In that case, there are of course not nine orientations of structured illumination but a suitable multiplicity of raw images obtained from scanning a sample 2. Each raw image 40 then corresponds to a specific scanning location, that is to say a specific scanning state during the scanning of the image.

The control unit 28 calculates a super-resolved result image 50 from the recorded raw images 40. The control unit is here for example configured to be switchable, so that it performs either the known conventional SIM evaluation or the method that has been improved according to the invention.

Figure 3:
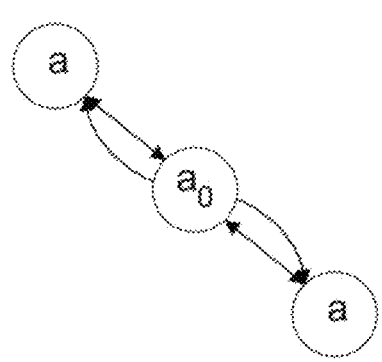

FIG. 3 schematically illustrates an example of the realization of the structured illumination by way of the grating 23. By diffracting coherent light, for example coming from the manipulator module 22, at the grating 23, beams that correspond to different orders of diffraction are produced. If, except for the zero order of diffraction and the +/−1 order of diffraction, the remaining orders of diffraction are blocked, three beams that interfere with one another in the sample 2 are present in the pupil of the objective 3, also referred to as back focal plane. The three beams in the objective pupil result in a stripe-shaped SIM illumination pattern 29 being formed in the sample due to interference, which pattern is also structured axially, that is to say longitudinally with respect to the optical axis of the objective 3 through the sample 2, due to the Talbot effect.

The interfering beams can also be generated in another way, for example by optical fibers ending in (or near) the pupil or by suitably arranged tilt-mirror matrices or by a lightwave-guiding chip as in US 2020/0064609 A1. Nor is the number restricted to three. The generation of the illumination pattern 29 shown in FIG. 3 is exemplary, but it has become the typical approach, in which the various discrete frequency bands present in the illumination pattern 29 are referred to as orders.

The illumination pattern 29 resulting from three interfering beams can be described by the following equation:

$$I(x,y,z,\varphi) = a_0^2/2 + a^2 + a^2 \cos(2^*\hat{k}_x x + 2^*\hat{k}_y y + 2\varphi) + 2^* aa_0 \cos(\hat{k}_x x + \hat{k}_y y + \varphi)^* \cos((\hat{k} - \hat{k}_z)z - \varphi_0) \quad (1)$$

Here, $a_0$ is the intensity of the central beam (zero order of diffraction of the grating 23) and a is the intensity of the beams (1 and −1 orders of diffraction of the grating 23) adjacent on both sides. The parameters $\hat{k}_x$, $\hat{k}_y$, $\hat{k}_z$ are the x-, y- and z-components of the wave vector of the lateral beams, $\hat{k}$ is the z-component of the wave vector of the central beam, and $(\hat{k}-\hat{k}_z)$ describes the depth dependence of the illumination pattern 29 formed by a cosine centered about a central plane, typically the focal plane of the illumination. Such a depth structure is also referred to as a Talbot pattern. $\varphi_0$ is the phase angle of said cosine profile with respect to the z-coordinate. $\varphi_0$ refers to the phase angle of the illumination pattern 15 in the x-y-plane, that is to say it is the parameter characterizing the individual SIM illumination patterns. They differ from one another only in terms of the value for $\varphi$. By way of example, in the case of five individual SIM illumination pattern phases there are five different values for $\varphi$. The phase angles are preferably equally distributed over a region of 180° within specific limits. As easily shown by a Fourier transform, the illumination pattern 29 is characterized by signal components with discrete spatial frequency bands, which correspond to orders.

Generally, the illumination pattern I(x, y, z) is multiplied on account of the interaction with the sample 2 by the optical properties thereof S(x, y, z) and convolved with the detection PSF H(x, y, z) to the measured light distribution $I_{em}$(x, y, z, z, $z_0$, $\varphi$):

$$I_{em}(x,y,z,z_0,\varphi) = \int dx'dy'dz' I(x',y',z',\varphi) S(x',y',z_0-z') H(x-x', y-y', z+z') \quad (2),$$

wherein $z_0$ indicates the distance of the considered sample plane from the focal plane, and z indicates the position of the focal plane. By setting z=0, a plane of the sample located in the focal plane of the illumination is considered, resulting in:

$$I_{em}(x,y,z,\varphi) = \int dx'dy'dz' I(x',y',z',\varphi) S(x',y',z_0-z') H(x-x',y-y',z') \quad (3)$$

The optical properties S(x, y, z) of the sample 2 are given for example by the distribution of the concentration of an emitting fluorescent dye in the sample 2 or the reflectivity of the sample 2.

The intermediate steps of the evaluation are preferably carried out in the spatial frequency domain. A Fourier transform with respect to x, y and z gives:

$$I_{em}^f(k_x,k_y,k_z) = \int dk_x' dk_y' dk_z' I^f(k_x',k_y',k_z') S^f(k_x-k_x',k_y-k_y',k_z) H^f(k_x,k_y,k_z-k_z') \quad (4)$$

A system of equations can be established on the basis of the concretely used illumination pattern I(x, y, z), more specifically on the basis of its Fourier transform $I^f(k_x, k_y, k_z)$, the detection PSF H(x, y, z) of the microscope, more specifically on the basis of its Fourier transform $H^f(x, y, z)$ that is to say of the OTF—and the intensity $I_{em}$(x, y, z) recorded in the raw images 40, more specifically on the basis of the Fourier transform $I_{em}^f(k_x, k_y, k_z)$ of the recorded raw images 40.

For three beams interfering in the sample 2, the result in the first step of inserting equation (1) into equation (4) is:

$$I_{em}^f(k_x,k_y,k_z,\varphi) = A_0 H^f(k_x,k_y,k_z) S^f(k_x,k_y,k_z) + A_2 H^f(k_x,k_y,k_z)$$
$$\{S^f(k_x+2\hat{k}_x, k_y+2\hat{k}_y, k_z) e^{-i2\varphi} + S^f(k_x-2\hat{k}_x, k_y-2\hat{k}_y, k_z)$$
$$e^{i2\varphi}\} + A_1\{H^f(k_x,k_y,k_z+[\hat{k}_z-\hat{k}])e^{i\varphi_0} + H^f(k_x,k_y,k_z-[\hat{k}_z-\hat{k}])e^{-i\varphi_0}\} S^f(k_x+\hat{k}_x, k_y+\hat{k}_y, k_z)e^{-i\varphi} + A_1\{H^f(k_x,k_y,k_z+[\hat{k}_z-\hat{k}])e^{i\varphi_0} + H^f(k_x,k_y,k_z-[\hat{k}_z-\hat{k}])e^{i\varphi_0}\} S^f(k_x-\hat{k}_x, k_y-\hat{k}_y, k_z)$$
$$e^{i\varphi} \quad (5).$$

Here, $A_j$ with j=0, 1, 2 denote the intensities of the orders of the illumination pattern, which emerge from the prefactors in equation (1). Thus, the following applies: $A_0 = a_0^2/2 + a^2$; $A\pm_1 = a^2$ and $A\pm_2 = a_0 a$. Further, $k = (k_x, k_y, k_z)$ is the wave vector which refers to the orders.

Equation (5) can be expressed in order terms:

$$I_{em}^f(k_x,k_y,k_z) = I_{em}^f(k) = D_0(k) + e^{-i2\varphi} D_{-2}(k) + e^{i2\varphi} D_2(k) + e^{i2\varphi} D_{-1}(k) + e^{i\varphi} D_1(k) \quad (1),$$

wherein the orders $D_n(k)$ are defined as $$D_j(k) = D_j(k_x, k_y, k_z) = \quad (2)$$

$$\begin{cases} A_0 OTF_n(k_x, k_y, k_z) S(k_x, k_y, k_z), & j=0 \\ A_2 OTF_n(k_x, k_y, k_z) S(k_x+2\hat{k}_x, k_y+2\hat{k}_y, k_z), & j=2 \\ A_2 OTF_n(k_x, k_y, k_z) S(k_x-2\hat{k}_x, k_y-2\hat{k}_y, k_z), & j=-2 \\ A_1 OTF_n(k_x, k_y, k_z) S(k_x+\hat{k}_x, k_y+\hat{k}_y, k_z), & j=1 \\ A_1 OTF_n(k_x, k_y, k_z) S(k_x-\hat{k}_x, k_y-\hat{k}_y, k_z), & j=-1 \end{cases}$$

and the optical transfer functions of the orders are:

$$OTF_j(k_x,k_y,k_z) = H^f(k_x,k_y,k_z) \text{ for } j=-2,0,2$$

$$OTF_j(k_x,k_y,k_z) = H^f(k_x,k_y,k_z+[\hat{k}_z-\hat{k}])e^{i\varphi_0} + H^f(k_x,k_y,k_z+[\hat{k}_z-\hat{k}])e^{-i\varphi_0} \text{ for } j=-1,1 \quad (8).$$

In order to individually obtain the five orders, n=5 measurements in different phase angles $\varphi = \varphi_m$, m=1, . . . , n of the illumination pattern 29 are necessary. Due to the n different displacement positions of the illumination pattern 29, n equations (6) are obtained therefrom one for each of the phases $\varphi_m$. Solving this system of equations brings about a separation of the orders, the result is n order spatial frequency spectra 41, which each contain one of the orders $D_j(k)$.

These are shifted in each case by $\hat{k}_x, \hat{k}_y$ to their original locations in the spatial frequency domain and combined into a spatial frequency spectrum of the intermediate result image:

$$S_{SR}^f(k_x, k_y, k_z) = \Phi(k_x, k_y, k_z) \sum_{j=-2}^{2} \omega_j(k_x, k_y, k_z) D_j(k_x - j\hat{k}_x, k_y - j\hat{k}_y, k_z), \quad (3)$$

wherein $\Phi(k_x, k_y, k_z)$ is an apodization function and $\omega_j(k_x, k_y, k_z)$ are the weights of the j-th order (SR stands for "super resolution"). The apodization function and the weights enable a manipulation of the order spatial frequency spectra 41 or $D_j(k)$, which serves to improve the results.

There are different possible approaches for the apodization function and the weights. $\Phi(k_x, k_y, k_z)$ can be defined, for example, as Euclidean distance transform of the binary mask that spans the support of the super-resolution OTF:

$$\sum_{j=-2}^{2} |OTF_j(k_x - j\hat{k}_x, k_y - j\hat{k}_y, k_z)|^2.$$

In conventional one-stage SIM methods (in which the intermediate result image already is the result image), the use of a generalized Wiener filter (as in Gustafsson et al.) gives the following weights:

$$\omega_j(k_x, k_y, k_z) = \frac{A_j OTF_j^*(k_x - j\hat{k}_x, k_y - j\hat{k}_y, k_z)}{w + \sum_{j=-2}^{2} A_j^2 |OTF_j(k_x - j\hat{k}_x, k_y - j\hat{k}_y, k_z)|^2} \quad (4)$$

with the Wiener parameter w and the order intensities $A_j$. In addition, for example a notch filter g can be used at the center of each order, as described by Bozinovic et al. in: "Fluorescence endomicroscopy with structured illumination," Optics Express, 2008, vol. 16, page 8016:

$$\omega_j(k_x, k_y, k_z) = \quad (5)$$

$$\frac{A_j g(k_x - j\hat{k}_x, k_y - j\hat{k}_y) OTF_j^*(k_x - j\hat{k}_x, k_y - j\hat{k}_y, k_z)}{w + \sum_{j=-2}^{2} A_j^2 g(k_x - j\hat{k}_x, k_y - j\hat{k}_y) |OTF_j(k_x - j\hat{k}_x, k_y - j\hat{k}_y, k_z)|^2},$$

wherein the notch filter g(x, y) can have, for example, a Gaussian shape:

$$g(x, y) = 1 - a \exp\left\{-\frac{x^2}{2\sigma^2} - \frac{y^2}{2\sigma^2}\right\}, \quad (6).$$

The variables a and $\sigma$ indicate the strength and width of the suppression. By calculating $S_{SR}^f(k_x, k_y, k_z)$ and an inverse Fourier transform ("iFT"), the result image $S_{SR}(x, y, z)$ can be directly ascertained.

In a two-stage method, the following weights can be used for example:

$$\omega_j(k_x, k_y, k_z) = B_j g(k_x - j\hat{k}_x, k_y - j\hat{k}_y) \quad (7),$$

wherein $B_j$ are order-dependent pre-factors. Other eights are, however, likewise possible.

The intermediate result image spatial frequency spectrum 44 is then a combination of the orders 41 ($D_j$) that have been shifted and those that have been manipulated (for example centrally notch-filtered) by the weights $\omega_j$:

$$S_{SR}^f(k_x, k_y, k_z) = \quad (8)$$

$$\Phi(k_x, k_y, k_z) \sum_{j=-2}^{2} B_j g(k_x - j\hat{k}_x, k_y - j\hat{k}_y) D_j(k_x - j\hat{k}_x, k_y - j\hat{k}_y, k_z).$$

As above, $\Phi(k_x, k_y, k_z)$ is an apodization function and g is for example a Gaussian notch filter. By applying this exemplary notch filter g to higher (non-zero) orders, artifacts can be reduced. In the zero order, by contrast, where the notch filter acts like a high-pass, it serves to block out-of-focus light.

On the other hand, inserting equation (7) into equation (14) gives for the intermediate result spatial frequency spectrum 44:

$$S_{SR}^f(k_x, k_y, k_z) = \Phi(k_x, k_y, k_z) S^f(k_x, k_y, k_z) \sum_{j=-2}^{2} B_j A_j g(k_x - j\hat{k}_x, k_y - \quad (9)$$

-continued $$j\hat{k}_y)OTF_j(k_x - j\hat{k}_x, k_y - j\hat{k}_y, k_z) =$$

$$\Phi(k_x, k_y, k_z)S^f(k_x, k_y, k_z)\sum_{j=-2}^{2} A_j\omega_j(k_x, k_y, k_z)OTF_j(k_x -$$

$$j\hat{k}_x, k_y - j\hat{k}_y, k_z) =,$$

in another representation $$S_{SR}^f(k_x,k_y,k_z) = S^f(k_x,k_y,k_z)OTF_{SR}(k_x,k_y,k_z) \quad (10)$$

with the following total OTF, composed of the OTFs (manipulated, for example centrally notch-filtered, like the orders $D_j$ by the weights $\omega_j$) of the individual orders:

$$OTF_{SR}(k_x, k_y, k_z) = \Phi(k_x, k_y, k_z)\sum_{j=-2}^{2} B_j A_j g(k_x - j\hat{k}_x, k_y - \quad (11)$$

$$j\hat{k}_y)OTF_j(k_x - j\hat{k}_x, k_y - j\hat{k}_y, k_z) =$$

$$\Phi(k_x, k_y, k_z)\sum_{j=-2}^{2} A_j\omega_j(k_x, k_y, k_z)OTF_j(k_x - j\hat{k}_x, k_y - j\hat{k}_y, k_z).$$

Equation (16) is a convolution represented in the spatial frequency domain, which can be re-weighted on the basis of the combination $S_{SR}^f(k_x, k_y, k_z)$ of the shifted and manipulated orders that is calculated according to equation (14) and on the basis of the total OTF $OTF_{SR}$ calculated according to equation (17) and can be solved in many ways using known deconvolution algorithms, for example by non-linear iterative algorithms such as Richardson-Lucy and preferably with the specification of constraints (such as non-negativity and smoothness) and possibly with regularization. Other deconvolution algorithms are also possible. In particular, non-iterative methods can be used.

For the pre-factors $B_i$, there are for example two simple possibilities:
1. $B_i \equiv 1$, so that the strengths $A_i$ of the orders determine the total OTF, or
2. $B_i = 1/A_i$, so that the strengths $A_i$ of the orders instead determine the combination of the order spatial frequency spectra 41 ($D_j$).

Other pre-factors $B_i$ are also possible.

It is not necessary to calculate the total OTF as a numerical intermediate result. Rather, for example the individual summation terms of the orders can be used directly in the re-weighting according to equation (16).

In order to completely capture the sample information, the illumination structure 29 that is one-dimensional in the considered sample plane in this example must be used and evaluated in a plurality of (typically three or five) orientations. The above equations should be expanded accordingly to a plurality of rotation phase angles.

Figure 4:
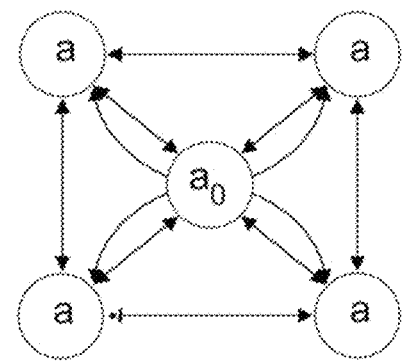

FIG. 4 schematically illustrates a further example of the realization of the structured illumination. For example five beams lie in the pupil of the objective 3 that interfere with one another in the sample 2 to form a three-dimensionally periodic light structure 29. For example, these five beams are generated using a chip (not depicted) arranged in the pupil. The resulting illumination pattern 29 can be described by the following equation:

$$I(x,y,z) = a_0^2/2 + 2*a^2 + 2*a^2\cos(2*\hat{k}_y y + \varphi_{-2-1}) + 2*aa_0$$
$$\cos(\hat{k}_x x + \hat{k}_y y + \varphi_{-20})*\cos((\hat{k} - \hat{k}_z)z - \varphi_0) + 2*a^2\cos$$
$$(2*\hat{k}_x x + \varphi_{-21}) + a^2\cos(2*\hat{k}_x x + 2*\hat{k}_y y + \varphi_{-22}) + 2*aa_0$$
$$\cos(\hat{k}_x x - \hat{k}_y y + \varphi_{-10})*\cos((\hat{k} - \hat{k}_z)z - \varphi_0) + a^2\cos$$
$$(2*\hat{k}_x x - 2*\hat{k}_y y + \varphi_{-11})$$

This illumination pattern is two-dimensionally periodic (grid pattern) in the sample plane under consideration. It results in n=13 different orders $D_j$, that is to say order spatial frequency spectra 41, which must be extracted in the spatial frequency domain and separated. Therefore, at least 13 raw images 40 of every sample plane to be considered are needed. As for the remainder, the evaluation corresponds to the procedure described above for three interfering beams with corresponding equations for 13 orders.

The intermediate result image spatial frequency spectrum is then composed of the thirteen manipulated order spatial frequency spectra 41 (that is to say $D_j$) that have been shifted to their original locations, $$S_{SR}^f(k_x, k_y, k_z) = \quad (12)$$

$$\Phi(k_x, k_y, k_z)\sum_{j=-6}^{6} B_j g(k_x - j\hat{k}_x, k_y - j\hat{k}_y)D_j(k_x - j\hat{k}_x, k_y - j\hat{k}_y, k_z)$$

with the total OTF $$OTF_{SR}(k_x, k_y, k_z) = \Phi(k_x, k_y, k_z)\sum_{j=-6}^{6} B_j A_j g(k_x - j\hat{k}_x, k_y - \quad (13)$$

$$j\hat{k}_y)OTF_j(k_x - j\hat{k}_x, k_y - j\hat{k}_y, k_z)$$

and $$D_j(k) = D_j(k_x, k_y, k_z) = \quad (14)$$

$$\begin{cases} A_0 OTF_0(k_x, k_y, k_z)S(k_x, k_y, k_z), & j = 0 \\ A_1 OTF_1(k_x, k_y, k_z)S(k_x, k_y, +2\hat{k}_y, k_z), & j = 1 \\ A_1 OTF_1(k_x, k_y, k_z)S(k_x, k_y - 2\hat{k}_y, k_z), & j = -1 \\ A_2 OTF_2(k_x, k_y, k_z)S(k_x + \hat{k}_x, k_y + \hat{k}_y, k_z), & j = 2 \\ A_2 OTF_2(k_x, k_y, k_z)S(k_x - \hat{k}_x, k_y - \hat{k}_y, k_z), & j = -2 \\ A_3 OTF_3(k_x, k_y, k_z)S(k_x + 2\hat{k}_x, k_y, k_z), & j = 3 \\ A_3 OTF_3(k_x, k_y, k_z)S(k_x - 2\hat{k}_x, k_y, k_z), & j = -3 \\ A_4 OTF_4(k_x, k_y, k_z)S(k_x + 2\hat{k}_x, k_y + 2\hat{k}_y, k_z), & j = 4 \\ A_4 OTF_4(k_x, k_y, k_z)S(k_x - 2\hat{k}_x, k_y - 2\hat{k}_y, k_z), & j = -4 \\ A_5 OTF_5(k_x, k_y, k_z)S(k_x + \hat{k}_x, k_y - \hat{k}_y, k_z), & j = 5 \\ A_5 OTF_5(k_x, k_y, k_z)S(k_x - \hat{k}_x, k_y + \hat{k}_y, k_z), & j = -5 \\ A_5 OTF_6(k_x, k_y, k_z)S(k_x + 2\hat{k}_x, k_y - 2\hat{k}_y, k_z), & j = 6 \\ A_5 OTF_6(k_x, k_y, k_z)S(k_x - 2\hat{k}_x, k_y + 2\hat{k}_y, k_z), & j = -6 \end{cases}$$

$$OTF_j(k_x, k_y, k_z) = H^f(k_x, k_y, k_z) \text{ for } j = 0, 1, 3, 4, 6 \text{ and} \quad (15)$$

$$OTF_j(k_x, k_y, k_z) = H^f(k_x, k_y, k_z + [\hat{k}_z - \hat{k}])e^{+i\varphi_0} +$$

$$H^f(k_x, k_y, k_z - [\hat{k}_z - \hat{k}])e^{-i\varphi_0} \text{ for } j = 2 \text{ and } j = 5$$

For the pre-factors $B_i$, the possibilities shown in relation to FIG. 3 exist for example, but others are also possible.

In all cases (as also in FIG. 3), the system of equations to be solved (and thus also the further evaluation steps) can be expanded to a plurality of sample planes (and thus three spatial dimensions), for example by introducing into the equation (9) a Dirac comb that links the equations for different sample planes. Both the order spatial frequency spectra 40 and the OTF 30 are then three-dimensional.

Figure 5:
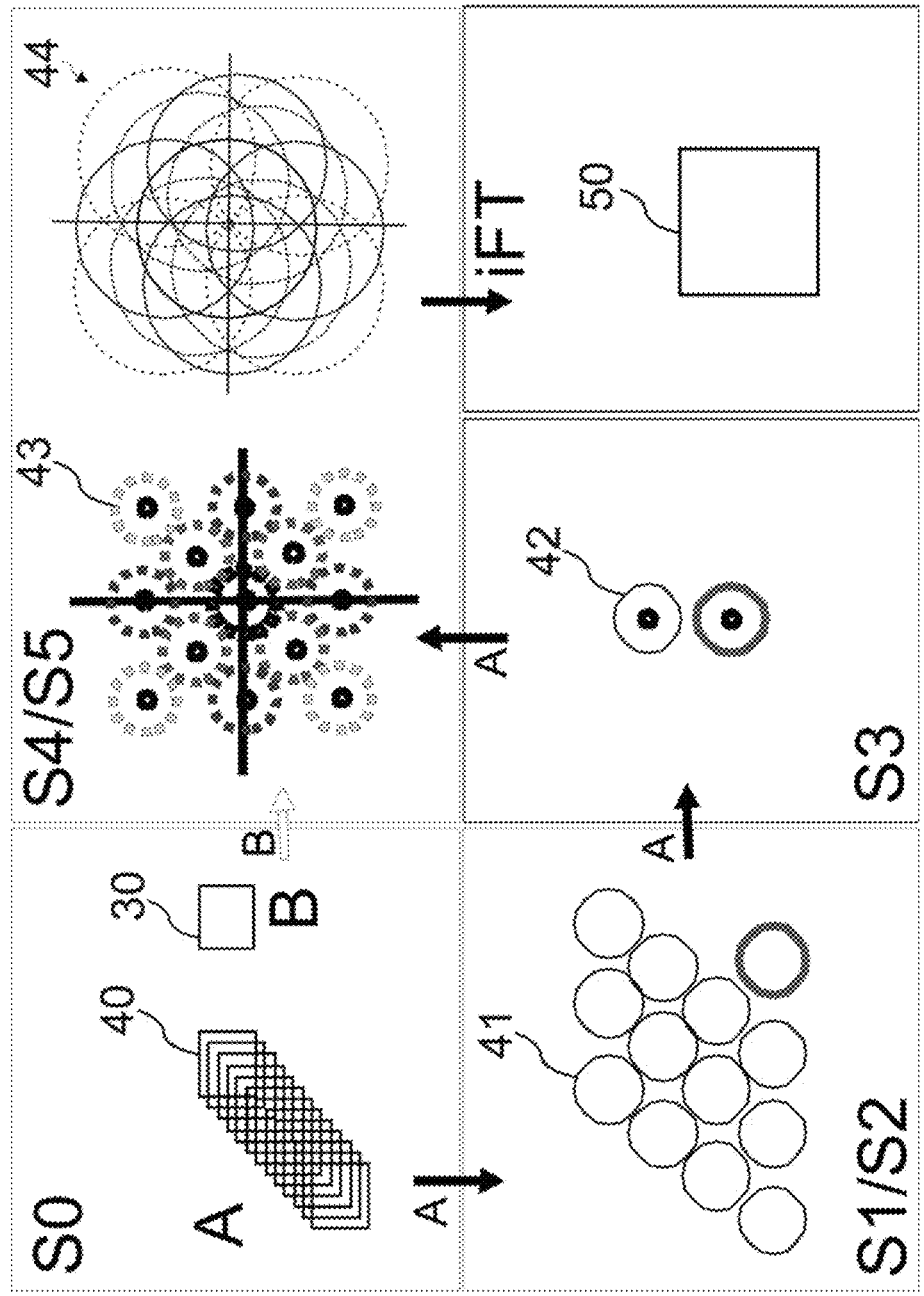

FIG. 5 schematically illustrates the procedure of a conventional one-stage SIM evaluation method.

As the starting point, thirteen raw images 40 and an OTF 30 of the microscope 1 are provided in step S0. The raw images were recorded for example in the microscope 1 at thirteen different illumination phase angles.

In step S1, as described above, a linear equation system is established and solved on the basis of the raw images 40 and on the basis of the OTF 30. The result is thirteen order spatial frequency spectra 41. The zero-order spectrum is illustrated by an emboldened border so as to stand out. In addition, in step 2, the respective actual phase angle (position) of the illumination structure 20 is ascertained from the raw images, and the actual grid frequencies of the illumination structure (generally the repetition frequencies thereof) are ascertained from the order spatial frequency spectra 41. These are used in the further evaluation.

In step S3, the order spatial frequency spectra 41 are manipulated, for example resulting in filtered order spatial frequency spectra 42. For example, a notch filter is applied centrally in each order 41 (illustrated by a circle at the center of each spectrum 41). In the zero order 41, this is used to suppress out-of-focus light, and in the remaining orders 41 to suppress grid frequencies. It is possible to apply a plurality of filters in succession or in combination.

In step S4, the filtered (or otherwise manipulated) order spatial frequency spectra 42 are shifted to their original locations in the spatial frequency domain. In step S5, these shifted spectra are weighted on the basis of their illumination intensity and on the basis of the OTF 30 and are put together by means of a generalized Wiener filter and an apodization function to form the super-resolved result image spatial frequency spectrum 44. The weighting on the basis of the OTF 30 is illustrated by various gray levels and a different degree of interruption in the lines.

The result image spatial frequency spectrum 44 is ultimately transferred from the spatial frequency domain into the spatial domain using an inverse Fourier transform in order to obtain the super-resolved result image 50.

Arrows labeled "A" are used in FIG. 5 to illustrate that the data from the raw images 40 are transferred from one evaluation step to the next one and are processed further. An arrow labeled "B" signifies that the OTF 30 is used only in the generalized Wiener filter in step S5, but not during the manipulation of the order spatial frequency spectra 41 in step S3.

Figure 6:
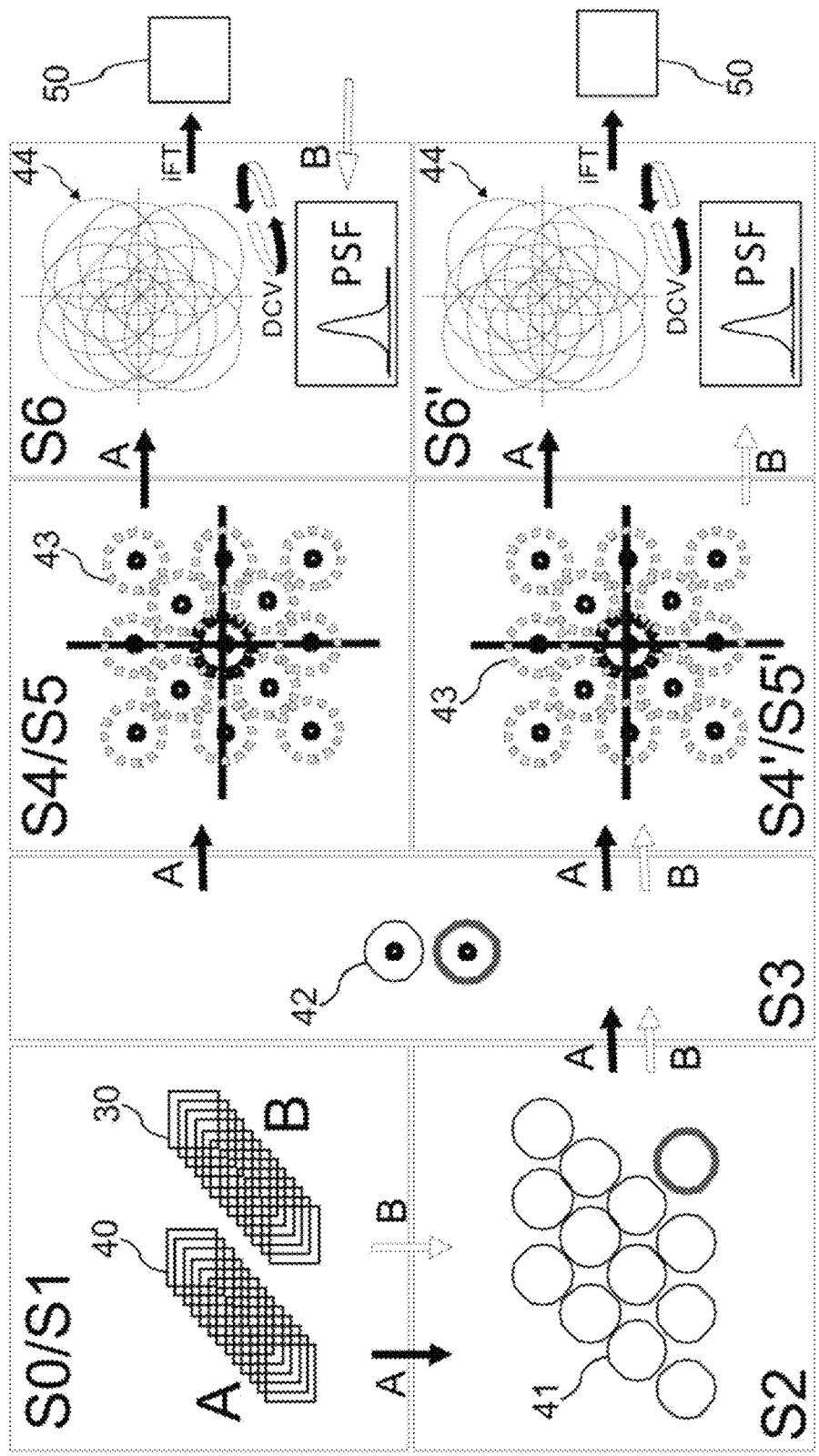

FIG. 6 schematically illustrates the procedure of a two-stage SIM evaluation method that has been improved according to the invention as compared to a conventional two-stage SIM method.

As the starting point, thirteen raw images 40 are provided in step S0 and transformed, for example by means of a Fourier transform, into the spatial frequency domain. In addition, the respective actual phase angle (position and orientation) of the illumination structure 29 is ascertained from the raw images, and the actual repetition frequencies (grid frequencies) of the illumination structure are ascertained from the local frequency spectra of the raw images. The actual repetition frequencies are used in the entire subsequent method as an actual parameter of the illumination structure.

The raw images were recorded for example using the microscope 1 at thirteen different illumination phase angles and are loaded from a mass storage means for the purposes of making them available, for example. In step S1, a PSF of the microscope 1 is ascertained by loading it for example from a mass storage means, and the OTF 30 is calculated therefrom by a Fourier transform and copied to obtain thirteen copies. The pre-stored PSF was ascertained for example by a measurement of a calibration sample with structured illumination.

In step S2, as described above, a linear equation system is established and solved on the basis of the raw images 40. The result is thirteen order spatial frequency spectra 41. The zero-order spectrum is illustrated by an emboldened border so as to stand out. Exactly one of the OTF copies 30 is assigned to each of the order spatial frequency spectra 41.

In step S3, the order spatial frequency spectra 41 ($D_j$) are manipulated, for example resulting in filtered order spatial frequency spectra 42 ($\omega_j D_j$). For example, a notch filter (g) is applied centrally in each order 41 (illustrated by a circle at the center of each spectrum 41). It is possible to apply a plurality of different filters successively or in combination, in particular depending on the relevant order. Depending on the type of manipulation (for example depending on the filter), per filter only one of the order spatial frequency spectra 41 or more than one or even all of them are manipulated. In the method that has been improved according to the invention, in an expanded step S3, the OTF copies 30 are manipulated accordingly with for example identical parameters, in particular filter parameters, as the respectively associated order spatial frequency spectrum 41.

In the conventional step S4, the filtered (or otherwise manipulated) order spatial frequency spectra 42 are shifted to their original locations in the spatial frequency domain, and in the conventional step S5 they are weighted on the basis of their illumination intensity (and not on the basis of the OTF 30 and without Wiener filter). Both in the conventional step S5 and in the improved version S5', a total OTF is ascertained in that the OTF copies 30 for each order spatial frequency spectrum 42 are shifted like the respectively associated order spatial frequency spectrum 42 and are added in a weighted manner to form a total OTF (not shown). The step S5' of the method that has been improved according to the invention differs from the conventional step 5 in that the OTF copies 30 manipulated in step S3 are used rather than the non-manipulated starting OTF used in the conventional step S5.

In the conventional step S6, the intermediate result image spatial frequency spectrum 44 is re-weighted on the basis of the (unchanged) OTF 30 and is deconvolved for example by an iterative method according to Richardson-Lucy, as a result of which the result image spatial frequency spectrum (not shown) is obtained. The result image 50 can be ascertained therefrom using an inverse Fourier transform.

The step S6' of the method that has been improved according to the invention differs from the conventional step S6 in that the re-weighting (and thus the deconvolution) is effected on the basis of the total OTF, which is composed of the OTF copies 30 that have been manipulated like the order spatial frequency spectra 42. Alternatively, the manipulated OTF copies 30 can be used without prior combination directly in the re-weighting (deconvolution).

The fact that the copies of the OTF are manipulated (in contrast to the conventional method) in correspondence with the order spatial frequency spectra 41 is illustrated by the arrows labeled "B."

Figure 7:
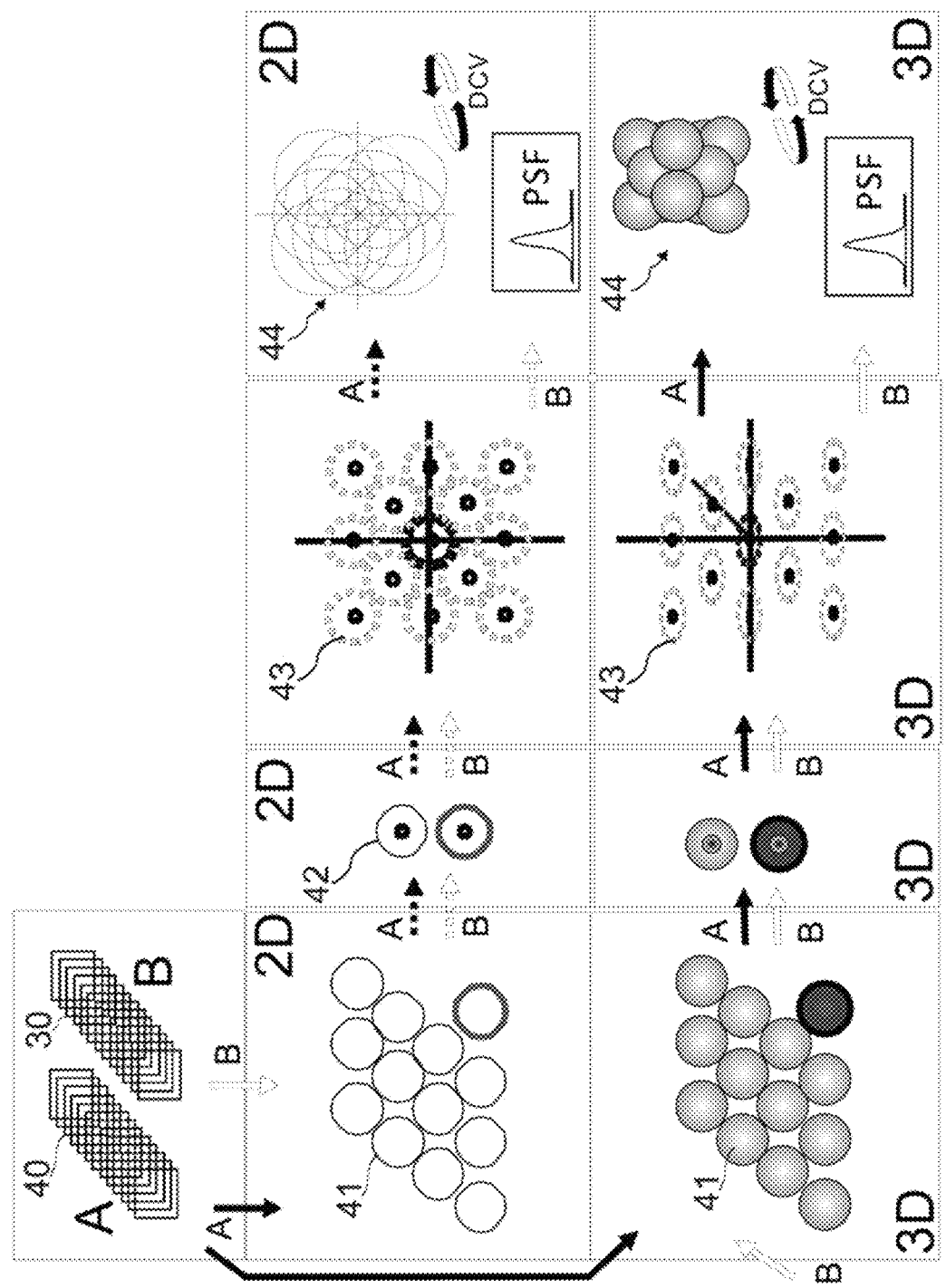
FIG. 7 illustrates the two-stage SIM evaluation that has been improved according to the invention in comparison with the known two-stage SIM evaluation.

FIG. 7 illustrates a method that has been improved according to the invention for three spatial dimensions as compared to the previously described 2D method. The OTFs 30 provided for the 3D case are three-dimensional from the start. The system of equations for ascertaining the three-dimensional order spatial frequency spectra 41 is also established and solved for three dimensions. The manipulation (filtering) of the order spatial frequency spectra 41 and of the OTF copies 30 also takes place in three dimensions, as do the weighting and combining to form the intermediate result spatial frequency spectrum and the re-weighting (finally deconvolution) on the basis of the manipulated OTF 30, for example by forming a total OTF (not shown).

Figure 8:
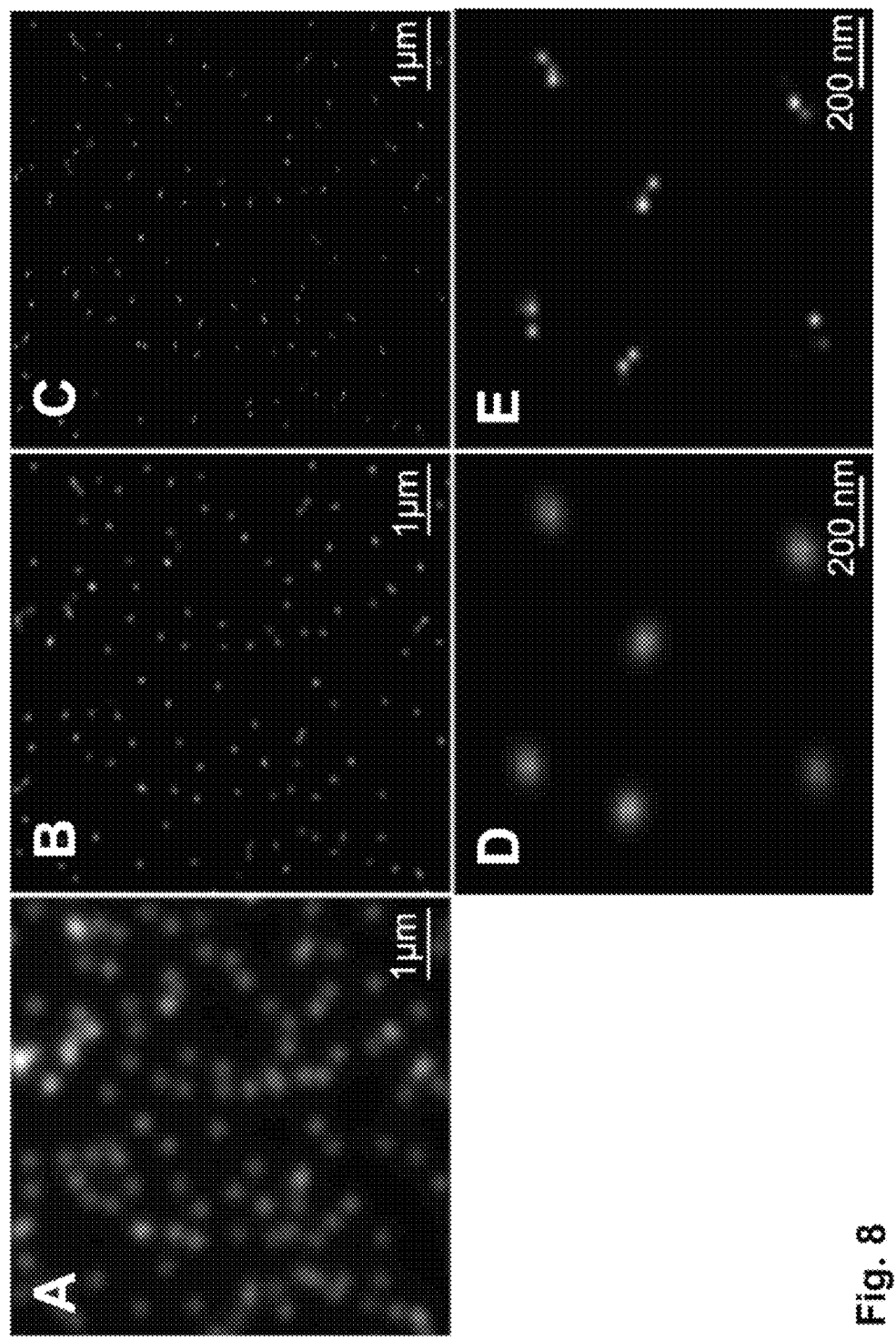
FIG. 8 shows a comparison between differently ascertained images of a sample.

FIG. 8 shows, one next to the other, a diffraction-limited image (A), a super-resolved result image (B) ascertained using conventional one-stage SIM, and a super-resolved image (C) ascertained according to the invention by means of two-stage SIM. The images all show the same region of a sample 2 to allow direct comparison. Beneath, enlarged sections from the conventional result image (D) and the result image (E) that has been ascertained according to the invention are illustrated. It is clear that the resolution in the images C and E is significantly better than in the images B and C.

The imaged sample 2 contained DNA origamis of GAT-TAquant (https://www.gattaquant.com) at a size of 60 nm with the fluorescent dye Alexa 488. Image A and the SIM raw images (not shown) were recorded using a 63×1.4 plan apochromat oil objective. The illumination pattern was generated as five-beam interference according to FIG. 4 and projected in 13 different phases into the sample 2, A 3D stack with seven planes was recorded, wherein 13 raw images 40 were recorded in each plane. Only one plane is shown.

It can be seen on the basis of the separately identifiable ends of the origamis that the SIM evaluation that has been improved according to the invention achieves, by contrast to the conventional SIM, a resolution of 60 nm.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Microscope
2 Sample
3 Objective
4 Beam splitter
5 Tube lens
6 CCD detector
7 Light microscope module
8 Widefield detection beam path
9 Laser scanning module
11 Switching mirror
12 Beam splitter module
13 Emission filter
14 Optical fiber
15 Laser module
16 Collective illumination beam path
17 Widefield illumination module
18 Switching mirror
19 TIRF illumination module
20 Optical fiber
21 Mirror
22 Manipulator module
23 Grating
24 Displacement drive
25 Image field rotator
26 Rotator drive
27 Tube lens
28 Control device
29 Illumination structure
30 PSF/OTF
40 Raw image
41 Order spatial frequency spectrum
42 Filtered order spatial frequency spectrum
43 Weighted filtered order spatial frequency spectrum
44 Intermediate result image spatial frequency spectrum
50 Result image
A Sample measurement data (raw images)
B PSF/OTF data

What is claimed is:

1. A method for super-resolution evaluation of microscope images of a sample, comprising:
providing a plurality of digital raw images of the sample, which are recorded sequentially by means of a microscope by illuminating the sample in different phases with periodically structured illumination light,
providing an optical transfer function (hereinafter "OTF") that represents imaging of the microscope,
ascertaining a plurality of order spatial frequency spectra on the basis of the raw images,
reconstructing an intermediate result image spatial frequency spectrum,
initial weighting the optical transfer function for each ascertained order spatial frequency spectrum,
re-weighting the intermediate result image spatial frequency spectrum on the basis of the weighted optical transfer function for each ascertained order spatial frequency spectrum, and
manipulating at least one of the plurality of order spatial frequency spectra before or during the reconstructing of the intermediate result image spatial frequency spectrum and correspondingly manipulating the optical transfer function for the relevant order spatial frequency spectrum, in particular with an identical algorithm or an identical mathematical operation as in the order spatial frequency spectra, before or during the re-weighting.

2. The method as claimed in claim 1, wherein said manipulating comprises spatial-frequency-dependent weighting, in particular spatial-frequency-dependent filtering, more particularly spatial-frequency-dependent notch filtering, and more particularly around a respective coordinate origin.

3. The method as claimed in claim 1, wherein the illumination light in the sample has at least one repetition frequency and the spatial-frequency-dependent filtering comprises notch filtering that is also dependent on the at least one repetition frequency, in particular notch filtering for the suppression at least of the at least one repetition frequency.

4. The method as claimed in claim 1, wherein the illumination light is also periodically structured along an optical axis of image recording and different raw images originate from different planes of the sample, wherein the ascertainment of the order spatial frequency spectra on the basis of raw images from different planes of the sample is effected such that three-dimensional order spatial frequency spectra are ascertained, and wherein the optical transfer function is provided three-dimensionally and the re-weighting is effected three-dimensionally.

5. The method as claimed in claim 1, wherein no weighting of the order spatial frequency spectra on the basis of the optical transfer function takes place during reconstruction, but in particular with weighting according to the respective illumination intensity.

6. The method as claimed in claim 1, wherein said manipulating differs from an integral transform and from a discrete transform, in particular in a manner such that the optical transfer function for the relevant order spatial frequency spectrum is changed.

7. The method as claimed in claim 1, wherein the re-weighting is performed for a deconvolution which is iterative, in particular non-linear, more particularly by means of a Richardson-Lucy method or a maximum-likelihood estimation, more particularly in significantly more than five iterations, in particular in more than 40 iterations, or wherein the deconvolution is not iterative.

8. The method as claimed in claim 1, wherein a manipulation of the raw images is performed before the order spatial frequency spectra are ascertained, in particular a spatial-frequency-dependent manipulation, more particularly a spatial-frequency-dependent frequency weighting, more particularly filtering and/or a deconvolution, in particular with the manipulation-free optical transfer function provided, and wherein the ascertainment of the order spatial frequency spectra takes place on the basis of the manipulated raw images.

9. The method as claimed in claim 1, wherein at least one actual parameter of the structured illumination, in particular a repetition frequency and/or an orientation and/or a position, is ascertained on the basis of at least one of the raw images or on the basis of the raw images manipulated as claimed in claim 8.

10. The method as claimed in claim 9, wherein the manipulation of the order spatial frequency spectra and of the optical transfer function (hereinafter "OTF") OTF for the relevant order spatial frequency spectrum comprises or is a respective shift and/or a respective weighting and/or a weighted summation, on the basis of the at least one ascertained actual parameter.

11. The method as claimed in claim 9, wherein the optical transfer function (hereinafter "OTF") OTF is provided on the basis of the at least one ascertained actual parameter, in particular by ascertaining simulated individual images under simulated structured illumination with the at least one ascertained actual parameter and an SIM evaluation of the simulated individual images, from which the OTF is ascertained.

12. The method as claimed in claim 1, wherein for each order spatial frequency spectrum a copy of the optical transfer function (hereinafter "OTF") OTF that is shifted in correspondence with the order spatial frequency spectrum is provided and in all method steps subsequent to providing an OTF a respective one of these copies is used as the OTF.

13. The method as claimed in claim 1, wherein different order spatial frequency spectra that are contained in the raw images or in the raw images that were manipulated as claimed in claim 8 are demodulated and separated during the ascertainment of the order spatial frequency spectra and shifted in the spatial frequency domain before or during the reconstruction of the intermediate result image, and wherein the separated and shifted order spatial frequency spectra are combined during the reconstruction of the intermediate result image.

14. The method as claimed in claim 1, wherein the weighted optical transfer functions are combined to form a total transfer function and the re-weighting takes place on the basis of the total transfer function, wherein in particular the manipulation of the optical transfer function for the relevant order spatial frequency spectrum takes place before or during the combination of the total transfer function.

15. A method for super-resolution imaging of a sample, wherein, by means of a microscope, comprising recording sample light emitted and/or scattered by the sample in each case with illumination of the sample in different phases with structured illumination light, said sample light emitted and/or scattered by the sample being recorded sequentially per phase by means of a detector into a respective raw image in a manner such that it is possible to reconstruct from the raw images an intermediate result image having a resolution that is increased compared to the raw images,
  providing an optical transfer function (hereinafter "OTF") that represents imaging of the microscope,
  ascertaining a plurality of order spatial frequency spectra on the basis of the raw images,
  reconstructing an intermediate result image spatial frequency spectrum,
  initial weighting the optical transfer function for each ascertained order spatial frequency spectrum,
  re-weighting the intermediate result image spatial frequency spectrum on the basis of the weighted optical transfer function for each ascertained order spatial frequency spectrum, and
  manipulating at least one of the plurality of order spatial frequency spectra before or during the-reconstructing of the intermediate result image spatial frequency spectrum and corresponding manipulation of the optical transfer function for the relevant order spatial frequency spectrum, in particular with an identical algorithm or an identical mathematical operation as in the order spatial frequency spectra, before or during deconvolution.

16. The method as claimed in claim 15, wherein a two-dimensionally spatially resolving detector is used to record the raw images, in particular without a stop that optically sections the sample in front of the detector.

17. A microscope having a control unit, and configured for carrying out a method as claimed in claim 1, and having a light source, a two-dimensionally spatially resolving detector for recording raw images of the sample, and means for generating periodically structured illumination light in the sample in different phases, wherein in particular no stop that optically sections the sample is arranged in front of the detector.

18. A computer program, comprising instruction coding configured for operating a control unit of a microscope for carrying out the method having the steps as claimed in claim 1.

* * * * *